May 12, 1942.  M. ZAWISTOWSKI  2,282,918
CLOTH CUTTING MACHINE
Filed April 11, 1941  3 Sheets-Sheet 3
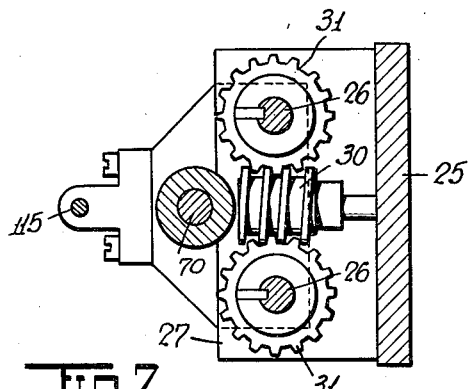
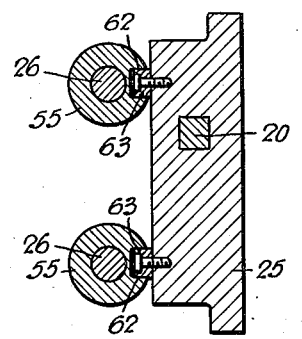
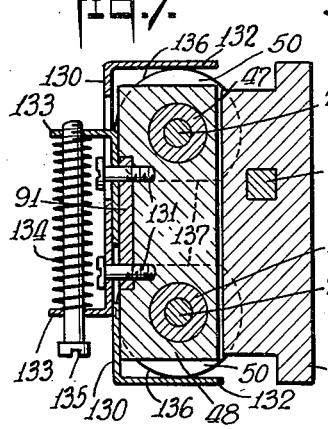
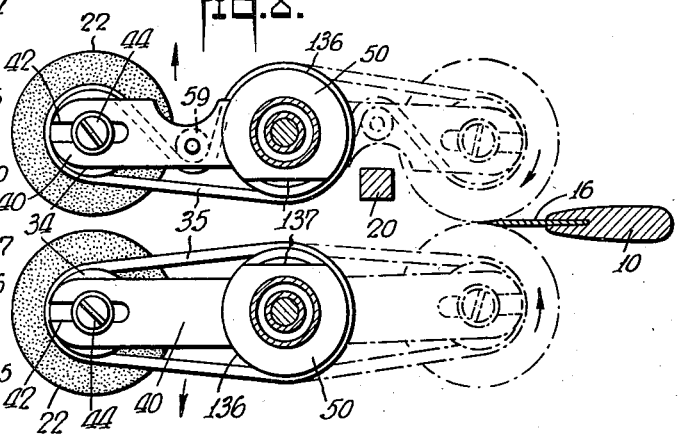
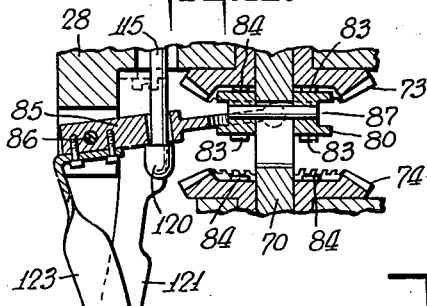
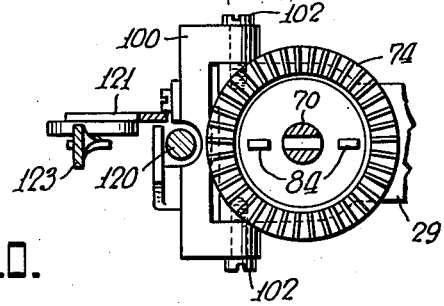
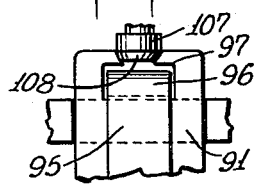
INVENTOR
Martin Zawistowski
BY
ATTORNEYS Patented May 12, 1942

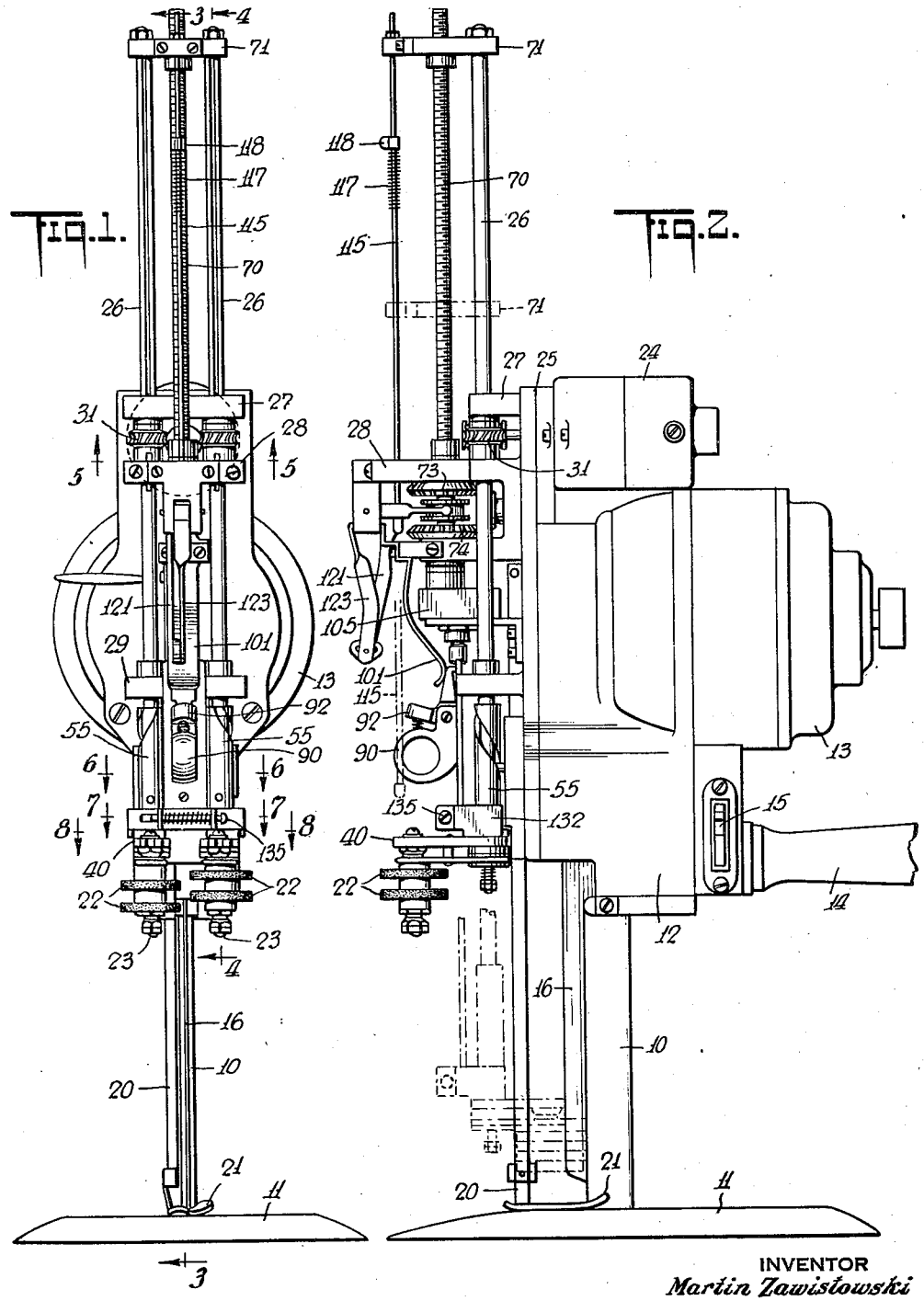

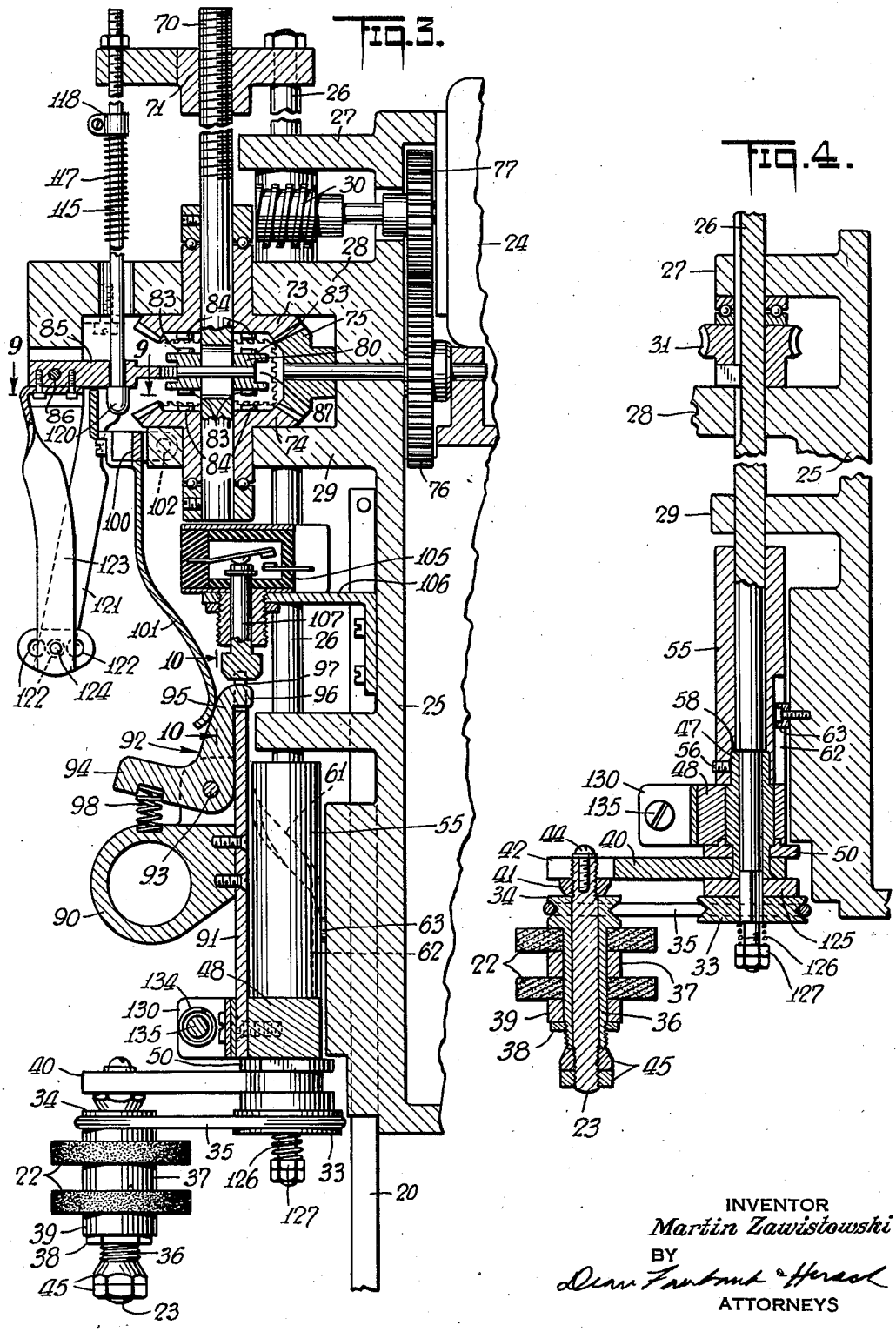

2,282,918

UNITED STATES PATENT OFFICE 2,282,918

CLOTH CUTTING MACHINE

Martin Zawistowski, Huntington, N. Y.

Application April 11, 1941, Serial No. 388,020

11 Claims. (Cl. 51—249)

The present invention relates to a mechanism for sharpening the reciprocable knife of a cloth cutting machine.

One object of the present invention is to provide new and improved means, whereby the operation of a power driven knife grinding mechanism is automatically controlled to terminate at the end of a grinding cycle.

Another object is to provide new and improved means for moving a power driven knife grinding mechanism along the knife to be sharpened, and for automatically shutting off the power to said mechanism when it has terminated its grinding cycle.

Another object is to provide new and improved means for moving a power driven knife grinding mechanism along the knife to be sharpened, and for automatically applying and shutting off the power to said mechanism at the beginning and at the end of its grinding stroke to initiate and terminate its grinding cycle.

Various other objects of the invention will be apparent from the following particular description and from an inspection of the accompanying drawings, in which—

Fig. 1 is a front elevation of a cloth cutting machine provided with a knife sharpening mechanism embodying the present invention.

Fig. 2 is a side elevation of the machine shown in Fig. 1.

Figs. 3, 4, 5, 6, 7 and 8 are sections taken on line 3—3, 4—4, 5—5, 6—6, 7—7 and 8—8 of Fig. 1 respectively.

Figs. 9 and 10 are sections taken on lines 9—9 and 10—10 of Fig. 3 respectively, and Fig. 11 is a detail of Fig. 3, but showing a clutch part in a different position.

The knife sharpening mechanism is shown attached to a cloth cutting machine of the general type shown in my prior Patent No. 1,568,705, issued January 5, 1926. The working parts of the illustrated machine are carried by a vertical standard 10, the lower end of which is secured to a base 11 adapted to slide beneath the layers of material to be cut. The standard 10 carries at its upper end a frame 12, which supports an electric motor 13, and which has rigid therewith a handle 14 for guiding and controlling the machine. The motor 13, which is controlled by a suitable switch 15, vertically reciprocates a cloth cutting knife 16 guided in a groove or slot in the front edge of the standard 10. In front of this knife 16 is a vertically adjustable guard bar 20 having a presser 21 at its lower end.

The knife sharpening mechanism is of the type shown and claimed in copending application Serial No. 323,111, and includes two sets of sharpening elements movable into engagement with opposite sides of the cutting edge of the knife 16. Each of these sets desirably comprises a pair of superposed coaxial grinding wheels 22 of emery or other suitable abrasive material, mounted on a vertical spindle 23, and driven from an electric motor 24 superposed on the knife operating motor 13. This motor 13 is suitably supported, as for instance by means of a frame plate 25 forming the head plate of the casing of the knife reciprocating motor 13.

The transmission between the motor 24 and the grinding wheels 22 includes a pair of upright shafts 26, suitably journalled in brackets 27, 28 and 29 rigid with and extending forwardly from the frame plate 25. These shafts 26 are driven in opposite directions from the motor 24 through a reduction gearing, desirably comprising a worm 30, secured to the shaft of the motor 24, and meshing with a pair of worm wheels 31, splined to said shafts respectively. These worm wheels 31 are supported between superposed brackets 27 and 28, and permit the shafts 24 to slide axially therethrough without interruption of the drive to said shafts.

The transmission between each shaft 26 and its corresponding set of grinding wheels 22 desirably includes a rope pulley 33, mounted on the lower end of said shaft for rotation therewith, a rope pulley 34 mounted on the spindle 23 for rotation with the corresponding pair of grinding wheels 22, and a drive rope 35 between said pulleys.

The drive connection between the pulley 34 and its corresponding set of grinding wheels 22 desirably comprises a sleeve extension 36 on said pulley loosely encircling the respective spindle 23. The two grinding wheels 22 are spaced apart by a washer 37, and are clamped for rotation with the pulley 34 and sleeve 36 by means of a nut 38, threaded to the lower end of the sleeve 36, and bearing against a washer 39 on the lower side of the lower grinding wheel. Nuts 45 threaded on the lower end of the spindle 23 form a stop for the lower end of the sleeve 36.

The two sets of grinding wheels 22 are bodily movable horizontally towards or away from knife sharpening position. For that purpose each spindle 23 is suspended from the outer end of an arm 40 extending radially of its respective shaft 26, and rotatable about said shaft.

For rotatably supporting each arm 40, the inner end thereof is press fitted or otherwise affixed to a sleeve 47, which loosely encircles the lower end of its respective shaft 26, and which is journalled in a cross bar 48 encircling both shafts 26. The arm 40 is spaced from the lower end of this cross bar 48 by a collar 50 rigid with the sleeve 47 for rotation therewith.

For swinging the two sets of grinding wheels 22 in opposite directions towards knife grinding position shown in dot and dash lines in Fig. 8, there is provided a cylindrical member in the form of a sleeve 55, loosely encircling each shaft 26 just above the cross bar 48, and encircling at its lower end an upper reduced portion of the sleeve 47. This sleeve 55 is made rigid with the sleeve 47 by any suitable means, such as set screw 56, so that both sleeves, the collar 50, and the arm 40 are free to rotate as a unit about their respective shafts 26, and with respect to the cross bar 48, and are movable vertically as a unit with said cross bar.

Upward vertical movement of the cross bar 48 is transmitted to the shafts 26 through the abutment of the upper ends of the sleeves 47 against annular shoulders 58 on said shafts respectively, while downward vertical movement of said cross bar is transmitted from the pulley 33 to said shafts in a manner to be hereinafter made apparent.

For swinging the two sets of grinding wheels 22 in an opposite direction between the two positions shown in Fig. 8, each sleeve 55 is comparatively long and has in its upper part a high pitch spiral groove 61 into which extends a roller 63 supported on the frame plate 25. A straight groove 62, extending lengthwise of each sleeve 55 in the lower part thereof, and merging into the lower end of the spiral groove 61 permits initial and terminal axial movements of the sleeves 55 without swinging the grinding wheels 22.

The spiral grooves 61 start from the upper ends of their respective sleeves 55, and extend 180° around said sleeves in opposite directions, so that the two sets of grinding wheels 22 will swing simultaneously and equally but in opposite directions upon axial movement of said sleeves. When the sleeves 55 are in uppermost inoperative position shown in Fig. 3, the rollers 63 extend into the respective straight grooves 62, so that the arms 40 extend forwardly of the cutting machine in the full line position indicated in Figs. 2, 3 and 8. When the sleeves 55 are lowered into position past the rollers 63, the arms 40 will have been rotated to the operative position shown in dot and dash lines in Figs. 2 and 8, with the two sets of grinding wheels 22 almost touching opposite sides of the knife 16. In this position, the arms 40 extend on opposite sides of the presser foot bar 20, which is offset with respect to the plane of the knife 16. To prevent this bar 20 from interfering with the inner run of the rope belt 35 nearest thereto, and to permit the operation of the sharpening device while the presser foot bar is lowered in operative position, said inner belt run is held back by an idler 59 suspended from an arm 40, as shown in Fig. 8.

To feed the grinding wheels 22 along the knife 16, there is provided an upright lead screw 70, threaded in a nut 71, and passing through the brackets 28 and 29. Journalled in the nut 71 are the two shafts 26, connected at their upper ends to said nut for vertical movement therewith.

For rotating the lead screw 70, there is provided a pair of opposed bevel clutch gears 73 and 74, loosely mounted on said screw between the brackets 28 and 29, and having their hubs journalled in said brackets respectively. These two gears 73 and 74 are driven in opposite directions by a bevel gear 75, meshing therewith and driven from the motor 24 through a gear 76, which is affixed to the shaft of said bevel gear 75, and which meshes with a gear 77 on the shaft of said motor. To effect drive engagement between either one of the two gears 73 and 74 and the lead screw 70, there is provided a clutch desirably comprising a clutch collar 80, slidably keyed to the lead screw 70 between said gears by any suitable means, as for instance a pin and elongated slot connection.

To effect clutch engagement between the collar 80 and either one of the two gears 73 and 74, said collar desirably has one or more lugs 83 on each side thereof, and the gears 73 and 74 have similar lugs 84 adapted to engage said lugs 83 when said collar is moved in one of its limiting positions on the lead screw 70 to rotate the corresponding gear with said collar.

For shifting the collar 80 into clutch engagement with either one of the two gears 73 and 74, there is provided a shifting lever 85, pivotally supported at 86 on a depending extension of the bracket 28 and having a fork extending in a peripheral groove 87 of the collar 80.

For shifting the lever 85, there is provided a finger piece 90 affixed to a plate 91 rigid with the cross bar 48. A bell crank 92, pivotally supported at 93 on a bracket extension of the finger piece 90, has an arm 94 serving as a thumb piece, and an arm 95 with an offset 96 at its outer end extending in a slot 97 at the upper end of the plate 91. A spring 98 between the finger piece 90 and the crank arm 94 urges the crank 92 crank clockwise in the position shown in Fig. 3.

A lever 101 is secured to a U-shaped bracket or yoke 100, pivotally supported on the frame structure of the machine at 102, and has its upper end engaging the underside of the shifting lever 85, and its lower end engaging the forward side of the crank arm 95, so that upon rotation of the crank 92 counter-clockwise (Fig. 3), the lever 101 will be rotated about the pivot point 102 to lift the shifting lever 85 counter-clockwise about the pivotal support 86, and thereby shift the collar 80 from the neutral position shown in Fig. 3 to the position shown in Fig. 11 in clutch engagement with the upper bevel gear 73. In this position of the collar 80, drive connection will be established between the upper gear 73 and the lead screw 70, and said screw will be rotated in a direction to effect downward movement of the nut 71, and in turn the rotating shafts 26.

For controlling the current to the motor 24, there is provided in the circuit of said motor a switch 105, mounted on a bracket 106 rigid with the frame plate 25, and operated by a plunger 107. The switch 105 normally tends to close, but is kept open by the plunger 107 having a bevelled head 108, which seats on a pair of bevel edges on opposite sides of the plate groove 97 of plate 91 when the knife grinding mechanism is in the elevated operative position shown in Fig. 3.

When the knife grinding mechanism is lowered from the position shown in Fig. 3, the corresponding lowering of the plate 91 releases the plunger 107, and permits the contacts of the switch 105 to close under the action of their inherent resiliency. The closing of the switch 105 causes rotation of the motor 24, so that the shafts 26 and the lead screw 70 are driven to rotate the grinding wheels 22, move the grinding mechanism downwardly and swing the grinding wheels 22 into sharpening engagement with the knife 16.

In order to effect the automatic return movement of the grinding wheels 22 after they have reached the end of their downward stroke, there is provided a vertical trip rod 115, secured near its upper end to the nut 71, and extending loosely through openings in bracket 27 and shifting lever 85. A coil spring 117 is adjustably secured to the upper end of the trip rod 115 by any suitable means, as for instance clamp 118, and bears downwardly against the shifting lever 85 when the grinding wheels 22 reach the end of their downward stroke. This bearing action of the spring 117 on the lever 85 shifts the clutch collar 80 downwardly out of engagement with the upper bevel gear 73 and into engagement with the lower bevel gear 74. This causes the lead screw 70 to rotate in reverse direction, so that the grinding wheels 22 start on their upward stroke. Towards the end of this upward stroke, the rollers 63 entering the respective spiral grooves 61 of the upwardly moving sleeves 55 rotate said sleeves, and thereby swing the grinding wheels 22 away from grinding engagement with the knife 16 into inoperative position shown in Fig. 3. When the grinding wheels 22 have reached the end of the upward stroke, a catch 120 on the lower end of the trip rod 115 will engage the underside of the lever 85 and shift thereby the clutch collar 80 into neutral inoperative position shown in Fig. 3. At the same time, the plate 91 travelling upwardly with the grinding wheels 22 will engage the plunger 107 and open the switch 105, so that the motor 24 will stop.

Snap means for releasably locking the clutch collar 80 into any one of its three axial positions desirably includes a depending arm 121, fixed to a frame part of the machine such as bracket 28, and having three depressions 122 punched or otherwise formed in said arm. A depending arm 123 secured to the shifting lever 85 has a projection 124 punched or otherwise formed thereon, and has a certain amount of inherent resiliency urging its lower end into engagement with the lower end of the arm 121. The projection 124 is disposed opposite the line of depressions 122, and is adapted to snap thereinto upon angular movement of the lever 85 in either one of its three positions.

When the collar 80 is in the neutral position shown in Fig. 3, the arm 123 will be in an angular position in which its projection 124 extends into the central depressions 122 to frictionally hold the shifting lever 85 against rotation, so that said collar will be retained in neutral position until shifted by operation of the crank 92. When the collar 80 is in its upper position in engagement with the gear 73, the projection 124 on arm 123 will extend in the right hand depression 122 (Figs. 3 and 11), and when the collar 80 is in its lower position in engagement with the gear 74, said projection will extend in the left hand depression 122. The operation of the crank 92 and the trip rod 115 is sufficient to overcome the frictional engagement of the two arms 121 and 123, and to move said arm 123 into either one of its two other clutch locking positions.

Means are provided for yieldably urging the two sets of grinding wheels 22 into grinding contact with opposite sides of the cutting edge of the knife 16 after the sleeves 55 have been moved to a position to free the drive rollers 63. This means desirably includes a friction washer 125 of hard rubber or the like, disposed between each bar 40 and its corresponding drive pulley 33, both the washer and the pulley being mounted on its respective shaft 26 for rotation therewith by any suitable means, as for instance by making the lower section of said shaft of rectangular cross-section. The washer 125 and pulley 33 are spring-pressed upwardly by means of a coil spring 126 seated on a nut 127, so that said washer is pressed against the underside of the arm 40. As the pulley 33 and the washer 125 are positively rotated, the arm 40 is frictionally rotated towards the knife 16 and yieldingly pressed against it.

The spring 126 serves not only to urge the pulley 33 in frictional contact with the washer 125, but also serves to yieldingly support the sleeve 55 and the cross bar 48 with respect to the shafts 26, so that said sleeve and cross bar are permitted to move downwardly a limited extent along said shaft at the beginning of the grinding operation to release the plunger 107 and initiate the grinding cycle. During this initial downward movement of the sleeve 55, the drive roller 63 extends in the straight groove 62 thereof, to facilitate this initial movement.

The frictional drive to the arms 40 is not effective until the sleeves 55 have been moved downwardly below the rollers 63 and said sleeves are free to rotate. After the sleeves 55 have been so released, the grinding wheels 22 will be almost in contact with the cutting edge of the knife 16, and the frictional drive from the rotating drive pulleys 33 through the washers 125 will yieldably maintain the rotating grinding wheels in grinding contact with the cutting edge.

In order to maintain a more effective grinding contact between the grinding wheels 22 and the knife 16, there is provided a pair of similar Z-shaped brackets 130, slidably supported by screws 131 on the cross bar 48, and having flanges 132 at one end engaging the collar 50, and flanges 133 at the other end facing each other in parallel relationship. A spring 134 extending between and bearing against the flanges 133 is supported on a guide rod 135, fixed to one of said flanges and loosely passing through the other, and urges the two brackets 130 apart and against the collars 50.

Each of the collars 50 has a circular edge section 136, concentric with its respective shaft 26 and a straight chordal section 137, and is so mounted that when the respective arm 40 extends forwardly in inoperative position shown in Fig. 3, the circular section 136 of the collar will be engaging the corresponding bracket flange 132, while the chordal edges 137 will be disposed diametrically opposite said flange, as shown in Fig. 7. While the circular collar sections 136 are engaged by the bracket flanges 132, the line of spring force of these flanges on the collars 50 extends through the axes of these collars, so that the spring-pressed brackets 130 have no turning effect on the wheel-carrying arms 40. When the two sets of grinding wheels 22 are swung into operative grinding position, the bracket flanges 132 engaging the flat sides 137 of the collars 50 will exert a turning force on the arms 40 tending to maintain the grinding wheels in effective grinding engagement with the knife.

Although the operation of the sharpening device is believed apparent from the foregoing description, this operation is briefly summarized.

While the sharpening device is in elevated inoperative position shown in Fig. 3, the switch 105 is open, so that the motor 24 is shut off and the arms 40 extend forwardly of the cutting machine in front of the motor 13 and the knife 16, and the grinding wheels 22 are in raised stationary position above the operating field of the knife, so that cutting operations can be effected without interference from said sharpening device.

When it is desired to sharpen the knife 16, the operator inserts his first finger in the finger piece 90, and with his thumb presses downwardly on the crank arm 94 to swing the lever 101 clockwise, and thereby effect shifting of the clutch collar 80 into engagement with the gear 73. At the same time the operator presses down on the finger piece 90 to cause downward movement of the plate 91, the sleeves 55, and the cross bar 48 in unison with respect to the shafts 26. This operation releases the plunger 107 and causes closing of the switch 105, so that the motor 24 is started. The operation of this motor causes the rotation of the lead screw 70, and since the shafts 26 are fixed to the nut 71, these shafts move downwardly to cause the downward movement of the two sets of grinding wheels 22 in unison with the sleeves 55. As the sleeves 55 move downwardly, they are rotated by the rollers 63, so that the arms 40 are swung about the axis of the shafts 26 to effect engagement of the wheels 22 with opposite bevelled sides of the knife cutting edge. At the same time, the shafts 26 are rotated to cause rotation of the grinding wheels 22 at high speed for grinding action.

When the two sets of grinding wheels 22 have reached the bottom of their downward stroke, the spring 117 engaging the shifting lever 85 causes the movement of the clutch collar 80 out of engagement with the gear 73 and into engagement with the gear 74. This operation causes a reverse rotation of the lead screw 70, so that the nut 71 travels upwardly carrying therewith the rotating shafts 26. As these shafts 26 are moved upwardly, they carry therewith the two sets of grinding wheels 22, and as soon as the sleeves 55 reach the position in which the rollers 63 enter the spiral grooves 61 thereof, these sleeves rotate to cause the swinging movement of the arms 40 and the corresponding movement of the two sets of grinding wheels 22 from engagement with the knife cutting edge to a position forwardly of the machine. As the two sets of grinding wheels 22 reach the end of their upward stroke, the catch 120 on the trip rod 115 shifts the lever 85 into position to move the clutch collar 80 out of engagement with the gear 74 and into the intermediate neutral position shown in Fig. 3. At the same time, the plate 91 engages the head of the plunger 107, and moves said plunger upwardly to open the circuit of the motor 24 and thereby terminate the operating cycle.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

What is claimed is:

1. A cloth cutting machine comprising an upright knife, a sharpening device for said knife, and means for moving said device along said knife, including a lead screw, a feed connection between said screw and said sharpening device, a pair of clutch gears loosely mounted on said screw, means for driving said gears in opposite directions, and a clutch collar on said lead screw rotatable therewith and slidable therealong between said gears into clutch engagement with either one of said gears.

2. In a cloth-cutting machine of the type having an upright knife, the combination comprising a sharpening device for said knife, a fixed motor, power transmission means driven from said motor for moving said device downwardly and upwardly along said knife, a switch in the circuit of said motor, means automatically operable when said device is moved manually downwardly a limited extent from an elevated inoperative position for closing said switch and thereby operate said motor to continue the downward movement of said device automatically through said transmission means, and means for automatically opening said switch when said device reaches the end of its upward stroke to shut off said motor.

3. In a cloth-cutting machine of the type having an upright knife, the combination comprising a grinding wheel, a fixed motor, means including a vertical shaft operated from said motor for driving said wheel for knife grinding operations, spring pressed means for yieldably supporting said wheel from said shaft to permit limited downward movement of said wheel with respect to said shaft against the action of the spring while maintaining a drive connection between said shaft and said wheel, power driven transmission means also operated from said motor for moving said wheel in both directions along said knife, means responsive to downward manipulation of said wheel from an elevated operative position for initiating the operation of said two motor operated means, and automatically operable when said wheel reaches the end of its upward stroke for terminating the operation of both of said motor operated means.

4. In a cloth-cutting machine of the type having an upright knife, the combination comprising a sharpening device for said knife, a fixed motor, a transmission between said motor and said device for moving said device along said knife in both directions, and including a reversible clutch having a pair of coaxial rotatable members driven in opposite directions, and a clutch member mounted between and coaxial with said rotatable members and movable axially into one of two reverse operative drive positions into coupling engagement with either one of said rotatable members or into inoperative position, means for shifting said clutch member from inoperative position to one of its operative positions upon downward manipulation of said sharpening device from elevated position to move said device automatically downwardly through said transmission, means for shifting said clutch member into its other operative position when said sharpening device reaches the end of its downward stroke for causing upward movement of said device, and means for shifting said clutch member into inoperative position when said device reaches the end of its upward stroke.

5. In a cloth-cutting machine of the type having an upright knife, the combination comprising a sharpening device for said knife, a motor, a lead screw, a nut threaded on said screw and mounted for axial movement with said sharpening device, whereby said sharpening device is moved along said knife upon rotation of said screw, a transmission between said motor and said lead screw for driving said lead screw, and including a reversible coupling, and a trip member movable with said nut for automatically reversing said coupling when said device reaches the end of its downward stroke for reversing the rotation of said lead screw and thereby cause upward movement of said sharpening device.

6. In a cloth-cutting machine of the type having an upright knife, the combination comprising a grinding wheel adapted to engage the cutting edge of said knife in sharpening contact therewith, a motor, a transmission from said motor for driving said wheel for knife grinding action, and including a shaft axially movable with said wheel, a nut connected to said shaft for axial movement therewith, a lead screw parallel to said shaft and threaded in said nut, and a transmission between said motor and said lead screw for rotating said lead screw.

7. In a cloth-cutting machine of the type having an upright knife, the combination comprising two sets of wheels adapted to engage opposite sides of the cutting edge of said knife, a motor, a transmission from said motor for driving said wheels for knife grinding action, and including a pair of upright parallel shafts movable axially with said wheels, a nut connected to said shafts for axial movement therewith, an upright lead screw parallel to said shafts and threaded in said nut, a transmission between said motor and said lead screw for rotating said lead screw, and including a reverse coupling, and trip means carried by said nut for reversing said coupling at the end of the downward stroke of said knife to effect reversal of rotation of said lead screw.

8. In a cloth-cutting machine of the type having an upright knife, the combination comprising a grinding wheel adapted to engage the cutting edge of said knife in sharpening contact therewith, a motor, a transmission from said motor for driving said wheel for knife grinding action, and including a shaft axially movable with said wheel, a nut connected to said shaft for axial movement therewith, a lead screw parallel to said shaft, threaded in said nut, and supported against axial movement, a transmission between said motor and said lead screw for rotating said lead screw, and including a pair of clutch gears loosely mounted on said lead screw, means for rotating said gears in opposite direction, and a clutch collar mounted on said lead screw for rotation therewith and axially shiftable between said gears in clutch engagement thereof, and a trip member connected to said nut for reversing the clutch collar from engagement with one gear into engagement with another when said wheel reaches the end of its downward stroke, to effect return upward movement of said wheel.

9. In a cloth-cutting machine of the type having an upright knife, the combination comprising a sharpening device for said knife, a motor, a transmission between said motor and said device for moving said device along said knife, and including a reversible clutch movable into one of two reverse operative drive positions and into inoperative position, a handle by which said device can be manipulated downwardly from an inoperative position, and means accessible for operation by the hand manipulating said handle for moving said clutch from inoperative position into one of its operative drive positions.

10. In a cloth-cutting machine of the type having a knife, the combination comprising a sharpening device for said knife, a motor, a switch in the circuit of said motor, a transmission between said motor and said device for moving said device along said knife, and including a reversible clutch movable into one of two reverse operative drive positions and into inoperative position, a handle by which said device may be manipulated to initiate the movement of said device along said knife from inoperative position, means responsive to this initial movement of said device for automatically closing said switch to start said motor, a finger piece accessible for operation by the hand holding said handle, and means responsive to the manipulation of said finger piece for moving said clutch from inoperative position into one of two reverse operative drive positions to effect movement of said device along said knife in one direction.

11. In a cloth-cutting machine of the reciprocating knife type, the combination comprising a pair of knife sharpening members movable up or down, and having pivotal supports permitting swinging movement of said members bodily about said supports, means for automatically swinging said members towards sharpening contact with the knife when said members are lowered from an elevated inoperative position, and for automatically swinging said sharpening members about their pivotal supports and away from said knife when said members are moved upwardly beyond a predetermined position, a fixed motor, power transmission means operated from said motor for automatically moving said members along said knife in both directions, a switch in the circuit of said motor, said sharpening members being manipulable downwardly a limited extent from an elevated inoperative position independently of the operation of said motor, and means automatically operable upon manipulation of said sharpening members downwardly from said elevated inoperative position for closing said switch to start the operation of said motor.

MARTIN ZAWISTOWSKI.